(12) United States Patent
McDonough et al.

(10) Patent No.: US 12,105,249 B2
(45) Date of Patent: Oct. 1, 2024

(54) REAL-TIME SWIFTWATER RISK CATEGORY DISTRIBUTED MAPPING

(71) Applicant: Vieux & Associates, Inc., Norman, OK (US)

(72) Inventors: Kelsey McDonough, Boulder, CO (US); Baxter E. Vieux, Boulder, CO (US); Ryan Hoes, Boulder, CO (US)

(73) Assignee: Vieux & Associates, Inc., Norman, OK (US)

( * ) Notice: Subject to any disclaimer, the term of this patent is extended or adjusted under 35 U.S.C. 154(b) by 10 days.

(21) Appl. No.: 17/882,930

(22) Filed: Aug. 8, 2022

(65) Prior Publication Data

US 2023/0051073 A1 Feb. 16, 2023

Related U.S. Application Data

(60) Provisional application No. 63/233,090, filed on Aug. 13, 2021.

(51) Int. Cl.
| | |
|---|---|
| *G01W 1/10* | (2006.01) |
| *G01W 1/14* | (2006.01) |
| *G06T 17/05* | (2011.01) |
| *H04W 4/029* | (2018.01) |
| *H04W 4/90* | (2018.01) |

(52) U.S. Cl.
CPC ............ *G01W 1/10* (2013.01); *G01W 1/14* (2013.01); *G06T 17/05* (2013.01); *H04W 4/029* (2018.02); *H04W 4/90* (2018.02)

(58) Field of Classification Search
CPC ...... G01W 1/10; G01W 1/14; G01W 2203/00; G06T 17/05; H04W 4/029; H04W 4/90; Y02A 10/40
See application file for complete search history.

(56) References Cited

U.S. PATENT DOCUMENTS

| | | |
|---|---|---|
| 10,289,760 B1 | 5/2019 | Oakes, III et al. |
| 2015/0019262 A1 | 1/2015 | Du et al. |
| 2016/0063635 A1 | 3/2016 | Collazo et al. |
| 2018/0165616 A1* | 6/2018 | Sun .................. G06Q 40/08 |
| 2021/0149927 A1 | 5/2021 | Coorey et al. |

* cited by examiner

*Primary Examiner* — Daryl C Pope
(74) *Attorney, Agent, or Firm* — Cesari & McKenna, LLP

(57) ABSTRACT

Described herein are methods and systems for real-time swiftwater risk category distributed mapping. A mobile computing device generates a request for swiftwater risk information, the request including a location. A server computing device receives the request for swiftwater risk information from the mobile computing device. The server computing device models hydrologic conditions for a plurality of segments of one or more bodies of water at or near the location. The server computing device classifies each segment of the bodies of water according to a level of potential risk of hazards associated with the hydrologic conditions. The server computing device generates a visual representation of the bodies of water that includes a classification indicator for one or more of the plurality of segments for display on the mobile computing device, and transmits the visual representation to the mobile computing device.

18 Claims, 5 Drawing Sheets

REAL-TIME SWIFTWATER RISK CATEGORY DISTRIBUTED MAPPING

RELATED APPLICATIONS

This application claims priority to U.S. Provisional Patent Application No. 63/233,090, filed on Aug. 13, 2021, which is incorporated herein in its entirety.

TECHNICAL FIELD

The subject matter of the application relates generally to computerized methods and systems for real-time swiftwater risk category distributed mapping.

BACKGROUND

Understanding the hazards of swiftwater conditions (such as flood waters) is not obvious. Knowing where and when a rescue in a stream or river can be accomplished by emergency personnel, is valuable and actionable information. In many instances, deep water may not be hazardous unless accompanied by high velocities. While shallow waters may not appear to be hazardous, when combined with high velocities, such conditions may be hazardous because the water may sweep a person or vehicle downstream. Sometimes, floating debris or objects such as a house or a car, can be indicative of hazard, but often people lack these visual cues and underestimate how fast water is truly moving or how deep the water is. They can also drive their vehicle onto an inundated road and not accurately judge the depth or velocity that can sweep them or their vehicle downstream during flooding.

In the United States, approximately eighty people per year perish in flash floods and many more require rescue by emergency responders. People can become stranded in flooded streams or rivers either bodily or in vehicles. Emergency responders may be tasked with accessing stranded persons by water board or both. The safety and feasibility of attempting a swiftwater rescue requires launching a rescue craft (e.g., board or boat). Understanding the hazards posed by attempting a swiftwater rescue in flowing water depends on having knowledge of current and forecast depth and velocity of the flood water at point A of launching craft and at point B, the location of the stranded person including the intervening space between point A and point B.

Emergency responders often need to deploy rescue boats into deep, swiftly flowing water to perform emergency rescue operations. An understanding of the potential risk associated with this type of swiftwater could improve the safety of an emergency response team and improve the overall rescue mission success. By modeling, mapping, and displaying both velocity and flow depth of flood waters in real-time, a risk category can be assigned that is advisory in nature.

To address this need, methods and systems have been developed to predict and convey the level of risk associated with a swiftwater rescue operation. Certain swiftwater rescue tools, which provide a mapped level of risk for emergency responders, typically computes the risk level using simulated velocity and depth, also referred to as stage, from a 1D/2D flood forecasting model capable of producing velocity and depth of discharge along a stream or river. For example, such a flood forecasting model can include the distributed, gridded, physics-based hydrological model—as described in U.S. Pat. No. 7,136,756 to Vieux et al., titled "Method for determining runoff," and in Vieux, B. E. et al., Vflo™: A Real-Time Distributed Hydrologic Model, Vieux & Associates, Inc., Proc. $2^{nd}$ Federal Interagency Hydrologic Modeling Conference, Las Vegas, Nevada, Jul. 28-Aug. 1, 2002, pp. 1-12, and Vieux, B. E., 2016, Distributed Hydrologic Modeling Using GIS. Third edition, Springer International Publishing AG, ISBN 978-94-024-0930-7, each of which is incorporated herein by reference.

Gridded modeling of flood velocity and depth, as provided by these systems, aids in the Geographic Information System (GIS) display for purposes of conveying current and future hazards posed to swiftwater rescue. Hydraulic/Hydrologic models could be utilized if computations are sufficiently efficient to be operated in real-time thus providing current and forecast flood velocity and depth of discharge. To be considered a real-time flood forecasting model, the model computations must be completed before the next input of hydrometeorological data, principally precipitation. Thus, if the model takes hours to run once it receives another increment of precipitation input, the model computations and output will fall behind and no longer be able to provide predictive information in near real-time.

Some flood forecasting modeling systems exist for predictive swiftwater rescue hazard, although these systems do not envision any application to swiftwater rescue. One example is the flood forecasting system or method described in U.S. Pat. No. 9,726,782 to Cordazzo et al., titled "Methods, systems and computer program storage devices for generating a response to flooding," which is incorporated herein by reference. Another hazard mapping patent that is similar in method, but does not envision swiftwater rescue application is U.S. Pat. No. 9,633,258 to Culp et al., titled "Hazard detection for asset management," which is also incorporated herein by reference. Culp et al. relates to a hazard detection tool that comprises analysis configured to: analyze the visual media to determine if a hazardous condition exists for each of the set of physical assets; and apply the GIS data to the visual media to determine a location of hazardous conditions within the infrastructure. Further, Culp et al. does not envision flooding as one of the hazards or the application in real-time to swiftwater rescue.

Vflo is currently used for real-time, operational flood forecasting and management of watersheds within the jurisdiction of the San Antonio River Authority (SARA), Texas. Each of the individual Vflo models used for computation of swiftwater risk were previously calibrated and validated using historical gauge-adjusted radar rainfall (GARR), and have been actively utilized in an operational, real-time context over the past three years and since 2007 for the City of Austin, Texas. However, the current art lacks any application of real-time distributed hydraulic/hydrologic modeling to predict current or future hazards associated with swiftwater rescue.

SUMMARY

Therefore, what is needed are methods and systems for predicting swiftwater hazards in real-time using a high-resolution hydrological model, to assist personnel in understanding the potential risks associated with swiftwater rescue operations along each segment of a stream or river during flooding. As mentioned above, the predictive hydrological model at high resolution as provided in real-time by Vflo advantageously provides certain elements that can be leveraged by the methods and systems described herein for better understanding of hazards posed by flood waters to swiftwater rescue.

The methods and systems described herein beneficially provide for the computation of swiftwater risk level in real time and further convey the level of risk (e.g., low, medium, and high via a mapping platform which is part of a decision support system (DSS). Using the DSS with location services enabled on a mobile computing device (e.g., smartphone, tablet), emergency responders can use the mapping application to identify the level of swiftwater risk at the location of an emergency rescue. This information provides emergency responders with the appropriate information to make on-the-ground decisions in real-time that impact the safety of the response team, type of rescue equipment appropriate to current and forecast conditions including the type of equipment needed and the number of personnel required to effect a successful rescue.

The technology described herein is directed to a system and method for producing real-time information from a real-time hydrologic model that displays potential risk, termed as hazard levels, for swiftwater rescues during flooding. In some embodiments, current and forecast hazard conditions are displayed on a DSS for a stream or river in a particular geographical region where the system has been configured. The hydrologic property of each hydrologic model grid cell in the region is simulated to produce the real-time hydrological model output for the geographical region. The technology described herein further includes a system and method for combining velocity and depth to represent potential risk determining runoff along each segment of the stream or river during flooding. The hydrologic model simultaneously solves for hydrologic quantities such as runoff depth and flow rates integral with hydraulic computations of depth and velocity. Thus, in each segment of the stream or river, the model generates velocity and depth outputs according to the channel geometry configured in the model to represent actual conditions in the stream or river. The model output of velocity and depth may be combined by a plurality of methods, and then classified according to the level or magnitude of potential risk of humans being swept off their feet, cars being washed off roads, or structures being moved by flood waters.

The invention, in one aspect, features a system for real-time swiftwater risk category distributed mapping. The system includes a mobile computing device that generates a request for swiftwater risk information, the request including a location. The system includes a server computing device that receives the request for swiftwater risk information from the mobile computing device. The server computing device models hydrologic conditions for a plurality of segments of one or more bodies of water at or near the location. The server computing device classifies each segment of the bodies of water according to a level of potential risk of hazards associated with the hydrologic conditions. The server computing device generates a visual representation of the bodies of water that includes a classification indicator for one or more of the plurality of segments for display on the mobile computing device. The server computing device transmits the visual representation to the mobile device.

The invention, in another aspect, features a computerized method of real-time swiftwater risk category distributed mapping. A mobile computing device generates a request for swiftwater risk information, the request including a location. A server computing device receives the request for swiftwater risk information from the mobile computing device. The server computing device models hydrologic conditions for a plurality of segments of one or more bodies of water at or near the location. The server computing device classifies each segment of the bodies of water according to a level of potential risk of hazards associated with the hydrologic conditions. The server computing device generates a visual representation of the bodies of water that includes a classification indicator for one or more of the plurality of segments for display on the mobile computing device. The server computing device transmits the visual representation to the mobile device.

Any of the above aspects can include one or more of the following features. In some embodiments, the location comprises global positioning system (GPS) coordinates. In some embodiments, modeling hydrologic conditions for a plurality of segments of one or more bodies of water at or near the location comprises: selecting one or more bodies of water at or near the location; determining a velocity and a depth of the selected bodies of water at one or more segments along the selected bodies of water; and calculating one or more of runoff depth and flow rate of the selected bodies of water at the one or more segments based upon the velocity and the depth.

In some embodiments, the server computing device generates a channel geometry-based velocity and a channel geometry-based depth for each of the one or more segments along the selected bodies of water using the calculated runoff depth and flow rate. In some embodiments, the server computing device uses a real-time distributed hydrologic model to generate the channel geometry-based velocity and the channel geometry-based depth. In some embodiments, classifying each segment of the bodies of water according to a level of potential risk of hazards associated with the hydrologic conditions comprises: generating time-series data comprising depth, discharge, and velocity values at one or more locations in each segment of the bodies of water using one or more of the velocity, the depth, the runoff depth, and the flow rate; determining a level of potential risk associated with each of the one or more locations in the segment of the bodies of water based upon the time-series data for the segment; and combining the level of potential risk associated with each of the one or more locations in the segment to generate an overall level of potential risk associated with the segment for a particular period of time.

In some embodiments, generating a visual representation of the bodies of water that includes a classification indicator for one or more of the plurality of segments for display on the mobile computing device comprises: rendering a map of the bodies of water on a display screen of the mobile computing device; and assigning the classification indicator as a visual element to one or more of the plurality of segments of the bodies of water based upon the overall level of potential risk associated with the segment. In some embodiments, the classification indicator comprises a color value corresponding to the overall level of potential risk associated with the segment. In some embodiments, upon receiving the visual representation from the server computing device, the mobile computing device generates an alert to notify a user of the mobile computing device. In some embodiments, the one or more bodies of water comprise moving bodies of water.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
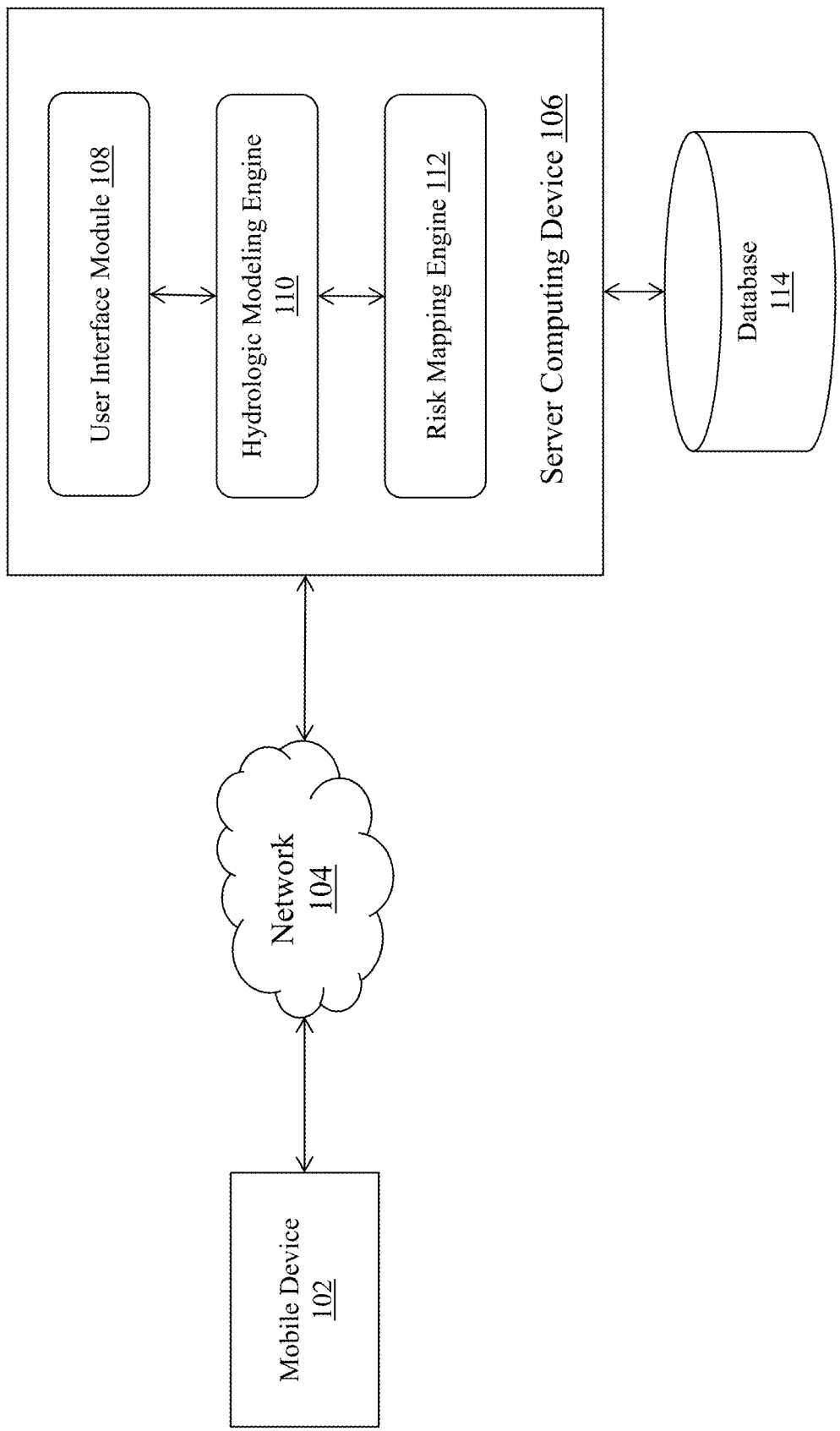
FIG. 1 is a block diagram of a system for real-time swiftwater risk category distributed mapping.

FIG. 1 is a block diagram of a system 100 for real-time swiftwater risk category distributed mapping. The system 100 includes a mobile computing device 102, a communication network 104, a server computing device 106 with a user interface module 108, a hydrologic modeling engine 110, and a risk mapping engine 112, and a database 114.

The mobile computing device 102 connects to one or more communications networks (e.g., network 104) in order to communicate with the server computing device 106 to provide input and receive output relating to the process of real-time swiftwater risk category distributed mapping as described herein. In some embodiments, the mobile computing device 102 is used by personnel at on-site rescue operations to assess current and future risks associated with swiftwater conditions at the site. Exemplary mobile computing devices 102 include but are not limited to laptop computers, tablets, smartphones, smart wearables, and the like. It should be appreciated that other types of computing devices that are capable of connecting to the components of the system 100 can be used without departing from the scope of invention. Although FIG. 1 depicts one mobile computing device 102, it should be appreciated that the system 100 can include any number of mobile computing devices.

In some embodiments, the mobile computing device 102 is configured with application software that enables the mobile computing device to establish a communication session with server computing device 106, receive data from the server computing device and send data to the server computing device. In some embodiments, the application software comprises a native application. In other embodiments, the application software comprises a browser-based application, such as a plugin or embedded module that runs in a browser application. For example, a native application is a software application (also called an 'app') that is installed locally on the mobile computing device and written with programmatic code designed to interact with an operating system that is native to the mobile computing device. In the example where the mobile computing device is a device such as a smartphone, the native application software is available for download from, e.g., the Apple® App Store or the Google® Play Store. In some embodiments, the native application includes a software development kit (SDK) module that is executed by a processor of the mobile computing device to perform functions associated with real-time swiftwater risk category distributed mapping as described herein.

In an example, a browser-based application comprises software executing on a processor of the mobile computing device that enables the mobile computing device to communicate via a defined protocol (e.g., HTTP or HTTPS) with remote servers addressable with URLs (e.g., server computing device 106) to receive website- and/or application-related content, including one or more webpages, for rendering in the browser application and presentation on the mobile computing device 102. Exemplary browser application software includes, but is not limited to, Firefox™, Chrome™ Safari™, and other similar software. The website- and/or application-related content can comprise visual and audio content for display to and interaction with a user (such as a geographic map of the rescue site that includes swiftwater risk indicators as described herein).

The communications network 104 enables the mobile computing device 102 to communicate with the server computing device 106. The network 104 is typically a wide area network, such as the Internet, satellite, or cellular network. In some embodiments, the network 104 is comprised of several discrete networks and/or sub-networks (e.g., cellular to Internet). As can be appreciated, the mobile computing device 102 can connect wirelessly to the network 104 using circuitry and other hardware coupled to and/or embedded in the mobile device 102, via one or more communication protocols (e.g., Bluetooth™, WiFi, LTE, 4G, 5G, and the like).

The server computing device 106 is a device including specialized hardware and/or software modules that execute on a processor and interact with memory modules of the server computing device 106, to receive data from other components of the system 100, transmit data to other components of the system 100, and perform functions for real-time swiftwater risk category distributed mapping as described herein. The server computing device 106 includes a user interface module 108, a hydrologic mapping engine 110, and a risk mapping engine 112 that execute on the processor of the server computing device 106. In some embodiments, the modules 108, 110, 112 are specialized sets of computer software instructions programmed onto one or more dedicated processors in the server computing device.

Although the modules 108, 110, 112 are shown in FIG. 1 as executing within the same server computing device 106, in some embodiments the functionality of the modules 108, 110, 112 can be distributed among one or a plurality of other computing devices that are coupled to the server computing device 106. As shown in FIG. 1, the server computing device 106 enables the modules 108, 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the modules 108, 110, 112 will be described in greater detail throughout this specification.

The database 114 is a memory location (resident on a computing device or in some embodiments, a plurality of computing devices) coupled to the server computing device 106. The database 114 is configured to receive, generate, and store specific segments of data relating to the process of real-time swiftwater risk category distributed mapping as described herein. In some embodiments, all or a portion of the database 114 can be integrated with the server computing device 106 or be located on a separate computing device or devices.

Figure 2:
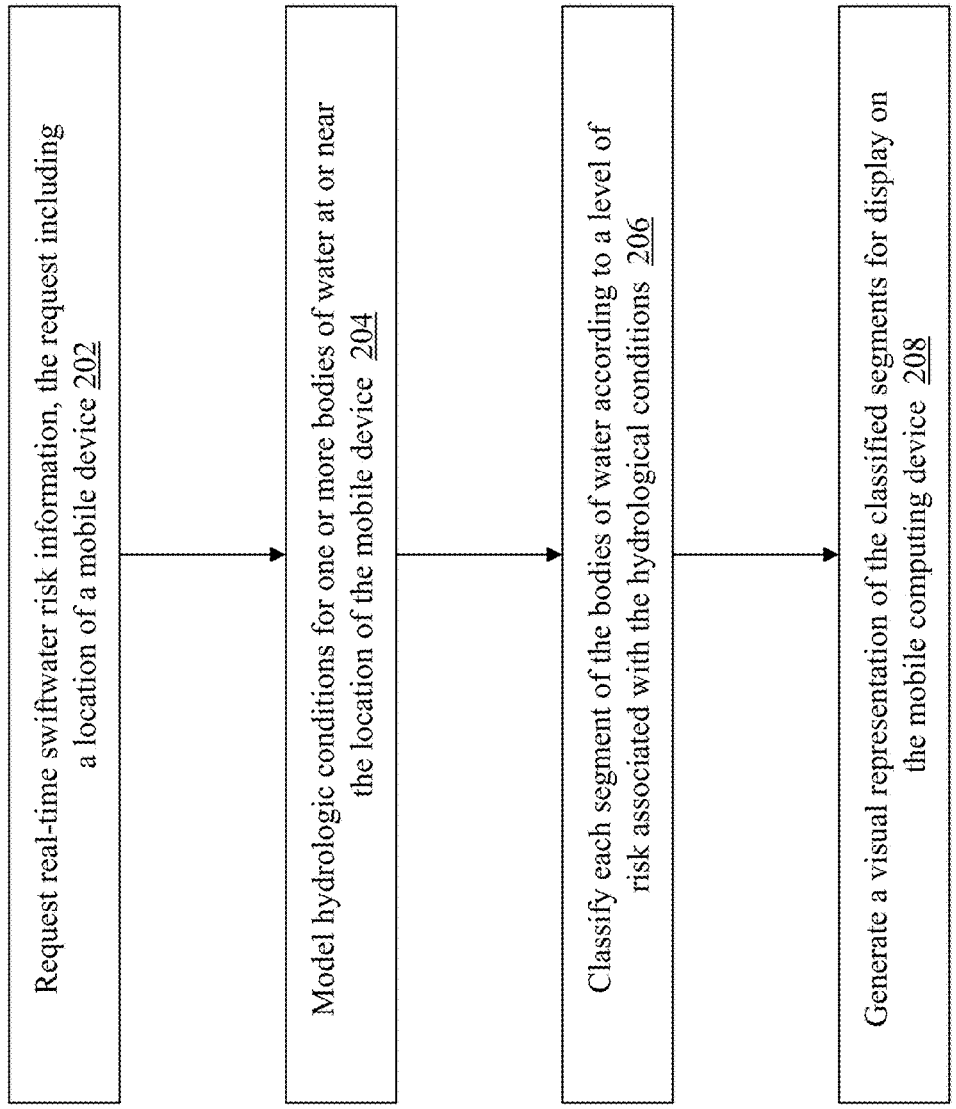
FIG. 2 is a flow diagram of a computerized method of real-time swiftwater risk category distributed mapping.

FIG. 2 is a flow diagram of a computerized method 200 of real-time swiftwater risk category distributed mapping, using the system 100 of FIG. 1. A user at mobile device 102 (e.g., rescue personnel at the site of flooding) launches an application on the device to connect to the server computing device 106 via network 104. The mobile device 102 requests (step 202) real-time swiftwater risk information from the server computing device 106. In some embodiments, as part of the request, the mobile device 102 transmits location information (e.g., GPS coordinates, latitude/longitude) to the server computing device 106 for use in generating the swiftwater risk information. It should be appreciated that, in some embodiments, the location information corresponds to an actual or approximate geographic location of the mobile computing device. In other embodiments, the location information generated and transmitted by the mobile computing device can be associated with a location that is different from the location of the mobile computing device 102—for example, a user at an operations center that is remote from the potential rescue location can view swiftwater risk conditions at the rescue location by providing associated location information to the mobile device 102 and/or server computing device 106.

The hydrologic modeling engine 110 receives the request from the mobile device 102 and models (step 204) hydrologic conditions for one or more bodies of water at or near the location of the mobile device 102. The hydrologic modeling engine 110 identifies the location of the mobile device 102 (e.g., using the location information provided by the mobile device), selects one or more bodies of water (e.g., rivers, streams) at the location, and models current and/or future hydrologic conditions of the selected bodies of water. As can be appreciated, the bodies of water that may be particularly relevant to the methods and systems described herein are moving bodies of water where certain conditions (e.g., flooding due to high rainfall and/or runoff) can increase the speed and/or volume of water to dangerous levels and pose the highest hazard to people and property.

In some embodiments, the hydrologic modeling engine 110 combines velocity and depth of the water at one or more segments along the bodies of water to generate an indicator of potential risk determining runoff during flooding. The hydrologic modeling engine 110 simultaneously solves for hydrologic quantities such as runoff depth and flow rates integral with hydraulic computations of depth and velocity. Thus, in each segment of the stream or river, the hydrologic modeling engine 110 generates velocity and depth outputs according to the channel geometry configured in the model (i.e., the Vflo model, as described in U.S. Pat. No. 7,136,756, which is incorporated herein by reference) to represent actual conditions in the stream or river. The model output of velocity and depth may be combined by a plurality of methods, and then the hydrologic modeling engine 110 classifies (step 206) each segment of the identified bodies of water according to, e.g., the level or magnitude of potential risk of hazards associated with the hydrologic conditions (such as humans being swept off their feet, cars being washed off roads, or structures being moved by flood waters).

The following example illustrates the progression and order of computations executed by the hydrologic modeling engine 110 used to classify swiftwater rescue risk that varies by location in the river or stream segments and with time during a flood. The hydrologic modeling engine 110 produces time-series data comprising depth, discharge, and velocity values at each grid or cross-section along the river or stream segments. The time-series of depth, discharge or velocity values is referred to as a hydrograph and is provided as output from the Vflo model. Because current and forecast values change with time, the plurality of current or maximum of future values may be taken to classify risk. The river or stream segments may be classified according to the level or magnitude of potential risk given the velocity and depth that is relevant to the location and time of the swiftwater rescue, which may include location(s) and times where the watercraft is put into the river and traversing the path to the location of the individual or vehicle stranded in floodwaters.

Figure 3:
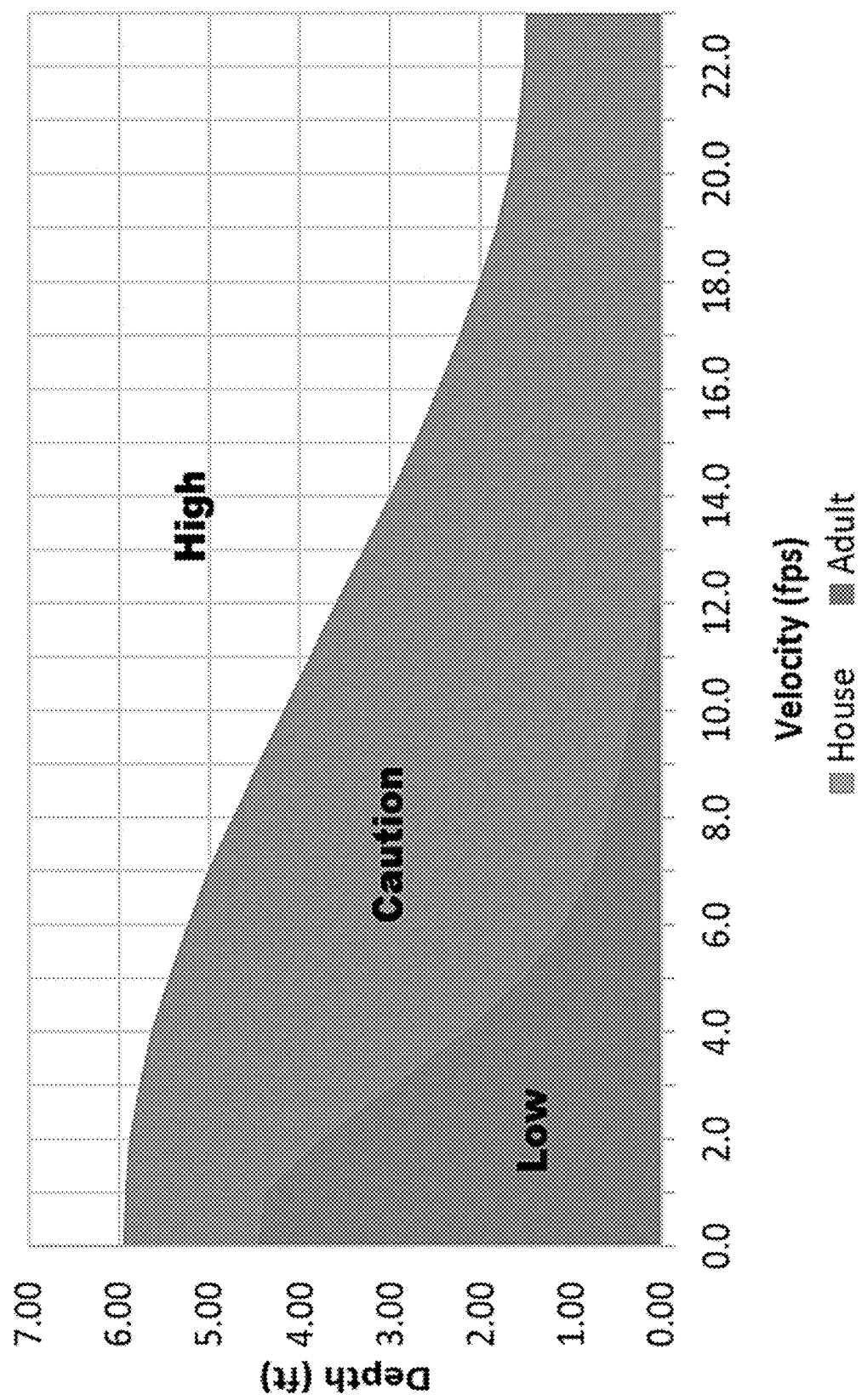
FIG. 3 is a diagram of a classification graph that can be used by the hydrologic modeling engine to classify the river or stream segments according to the level or magnitude of potential risk.

FIG. 3 is a diagram of a classification graph 300 that can be used by the hydrologic modeling engine 110 to classify the river or stream segments according to the level or magnitude of potential risk. This graph 300 relates the combination of depth and velocity representing the hazard of an object being swept away by flood waters. An example for hazard quantification is found in Trieste, Douglas J., "Downstream hazard classification guidelines," U.S. Dept. of the Interior, Bureau of Reclamation, 1988, which is incorporated herein by reference. Trieste presents recommended envelope curves relating velocity and depth of flood discharge resulting from dam failure. Classification is provided for various categories: Adults, Houses, or Vehicles stranded in flood waters.

Another embodiment of classifying hazards of swiftwater rescue relies on depth and velocity to compute the forces that may sweep an object away due to the momentum of flow impinging on an object and the resisting friction. This embodiment anticipates a plurality of assumptions concerning the mass, buoyancy, and friction force resisting the impinging flow. For example, the hydrological modeling engine 110 can compute friction forces of wet concrete and rubber surfaces using a coefficient of friction and used to estimate the hazard for swiftwater rescues. The Classification of velocity and depth on mass, area, friction and resulting buoyancy and impinging flow forces that can sweep a person off their feet, a vehicle that entered a flooded roadway, or move a house from its foundation may be estimated by the hydrological modeling engine 110 using the information depicted in FIG. 3. As shown, velocity along the horizontal axis and depth along the vertical axis for a particular instance of flowing water determines which hazard classification is advised.

Figure 4:
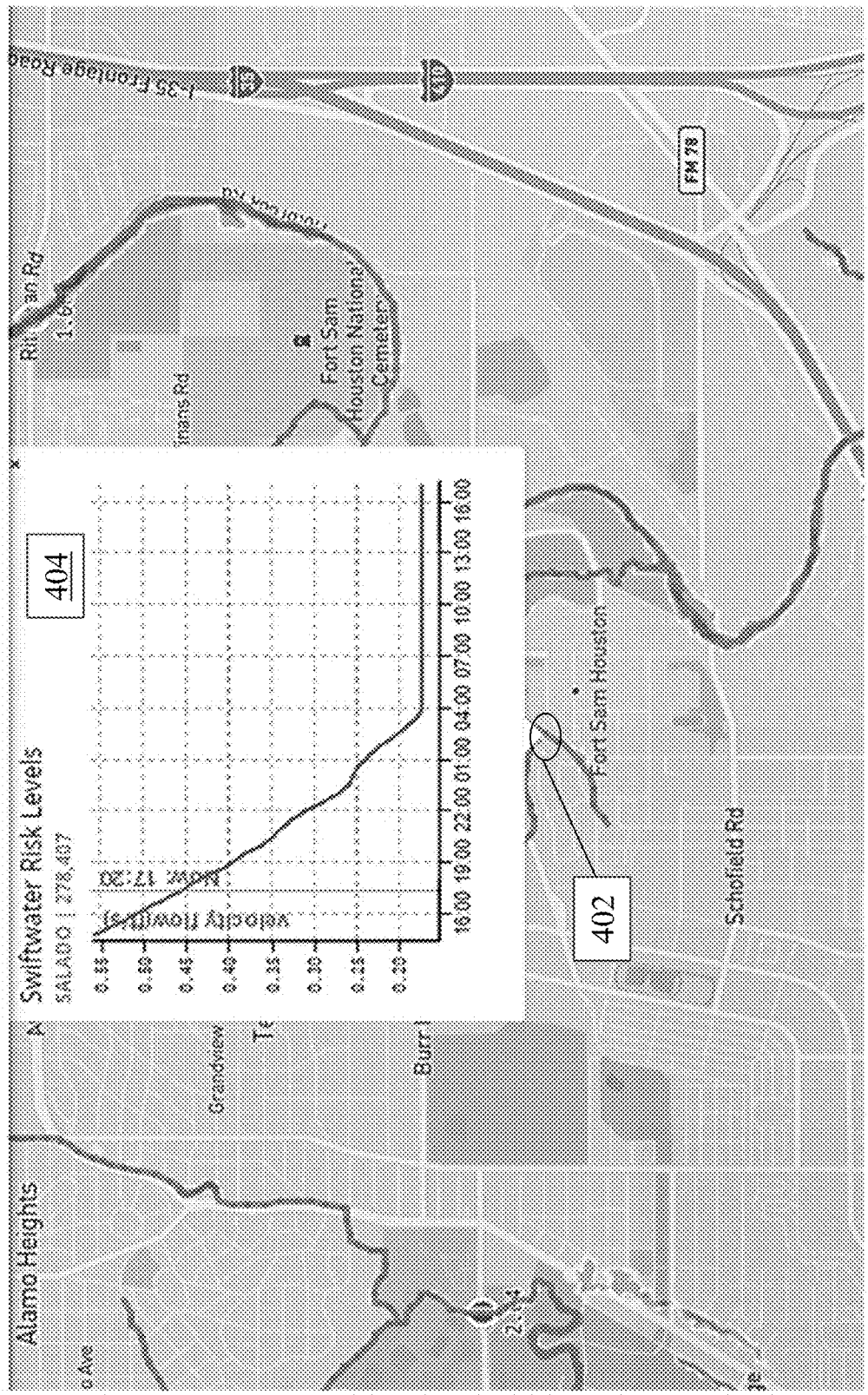
FIG. 4 is a diagram of a map as generated by the risk mapping engine for displaying real-time inundation mapping.

Turning back to FIG. 2, once each segment of the river or stream is classified by the hydrologic modeling engine 110, the risk mapping engine 112 generates (step 208) a visual representation of the classified segments for display on the mobile computing device 102. FIG. 4 is a diagram of a map 400 as generated by the risk mapping engine 112 for displaying real-time inundation mapping. As can be appreciated, when displayed on the mobile device 102, the map 400 is interactive—meaning that a user of device 102 can navigate around the map using interface features of the mobile device (e.g., click, scroll, tap, pinch, etc.), selecting different segments of rivers and streams to analyze details about the swiftwater modeling characteristics and risk levels for each segment. As shown in FIG. 4, the user has selected a segment of a river 402 near Fort Sam Houston. Upon hovering over and/or clicking the segment 402, the risk mapping engine 112 (in conjunction with the user interface module 108) generates an inset window 404 that shows swiftwater risk levels at the current time 404*a* (i.e., 17:20) through the future time of 16:00 the following day. This inset provides the user with actionable information about the current and anticipated risk levels in the area which can inform rescue personnel about potential hazards and enable them to develop a safe and effective strategy for carrying out rescue operations.

Figure 5:
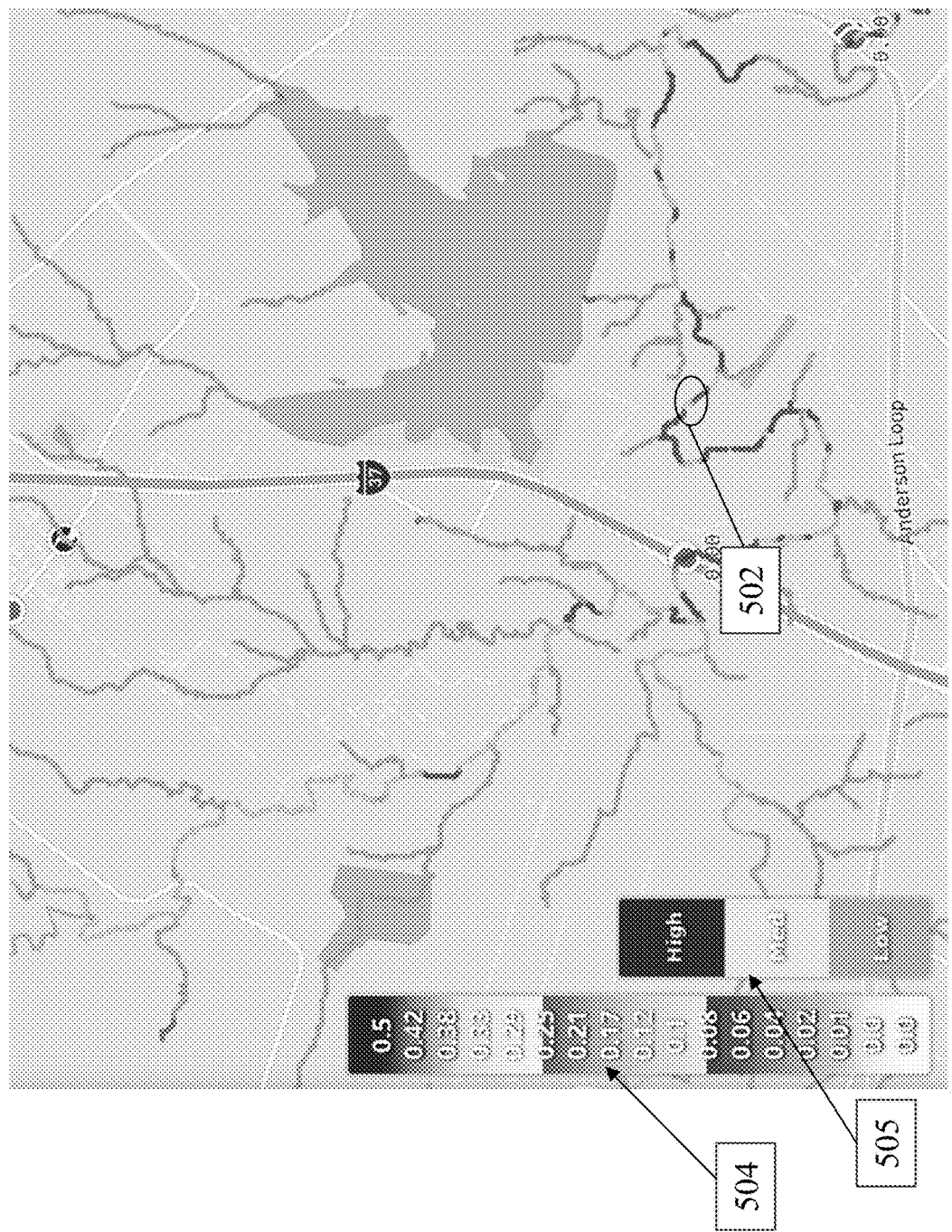
FIG. 5 is a diagram of a map as generated by the risk mapping engine for displaying hazard classification information for a plurality of segments of rivers and/or streams in a geographical area.

FIG. 5 is a diagram of a map 500 as generated by the risk mapping engine 112 for displaying hazard classification information for a plurality of segments of rivers and/or streams in a geographical area. As shown in FIG. 5, the segments of rivers and streams (e.g., segment 502) are color-coded according to the hazard risk associated with swiftwater conditions in the segment. For the purposes of explanation in the present application, the map 500 is presented in a grayscale color scheme, such that the hazard risks are colored as follows: black for high risk, light gray for medium risk, and dark gray for low risk. It should be appreciated, however, that in preferred embodiments the map 500 is presented in full color—including the hazard risk classification. An exemplary color scheme for the hazard risk classification can be red for high risk, yellow for medium risk, and green for low risk. A depth legend 504 and a risk legend 505 are provided for the user to understand the classification scheme. Using this information, a rescuer can determine the optimal entry point for the river or stream—such as a segment that carries a low risk of hazard—to initiate operations.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peerto-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, smartphone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing devices include, for example, iOS™-based devices such as the iPhone™ and iPad™ available from Apple, Inc., and Android™-based devices such as the Galaxy™ available from Samsung Corp., the Pixel™ available from Google, Inc., and the Kindle Fire™ available from Amazon, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A system for real-time swiftwater risk category distributed mapping, the system comprising:
    a mobile computing device that generates a request for swiftwater risk information, the request including a location; and
    a server computing device that:
        receives the request for swiftwater risk information from the mobile computing device;
        models hydrologic conditions for a plurality of segments of one or more bodies of water at or near the location, including:
            selecting one or more bodies of water at or near the location,
            determining a velocity and a depth of the selected bodies of water at one or more segments along the selected bodies of water,
            calculating one or more of runoff depth and flow rate of the selected bodies of water at the one or more segments based upon the velocity and the depth, and
            computing a friction force of a surface material at the one or more segments;
        classifies each segment of the bodies of water according to a level of potential risk of hydrologic forces sweeping a moveable object away based upon the corresponding flow rate and associated friction force;
        generates a visual representation of the bodies of water that includes a classification indicator for one or more of the plurality of segments for display on the mobile computing device; and
        transmits the visual representation to the mobile computing device.

2. The system of claim 1, wherein the location comprises global positioning system (GPS) coordinates.

3. The system of claim 1, wherein the server computing device generates a channel geometry-based velocity and a channel geometry-based depth for each of the one or more segments along the selected bodies of water using the calculated runoff depth and flow rate.

4. The system of claim 3, wherein the server computing device uses a real-time distributed hydrologic model to generate the channel geometry-based velocity and the channel geometry-based depth.

5. The system of claim 1, wherein generating a visual representation of the bodies of water that includes a classification indicator for one or more of the plurality of segments for display on the mobile computing device comprises:
    rendering a map of the bodies of water on a display screen of the mobile computing device; and
    assigning the classification indicator as a visual element to one or more of the plurality of segments of the bodies of water based upon the overall level of potential risk associated with the segment.

6. The system of claim 5, wherein the classification indicator comprises a color value corresponding to the overall level of potential risk associated with the segment.

7. The system of claim 1, wherein upon receiving the visual representation from the server computing device, the mobile computing device generates an alert to notify a user of the mobile computing device.

8. The system of claim 1, wherein the one or more bodies of water comprise moving bodies of water.

9. The system of claim 1, wherein the level of potential risk of hydrologic forces sweeping an object away based upon the corresponding flow rate and associated friction force for a segment of the bodies of water is used to estimate a hazard for undertaking a swiftwater rescue at the location of the segment.

10. A computerized method of real-time swiftwater risk category distributed mapping, the method comprising:
    generating, by a mobile computing device, a request for swiftwater risk information, the request including a location;
    receiving, by a server computing device, the request for swiftwater risk information from the mobile computing device;
    modeling, by the server computing device, hydrologic conditions for a plurality of segments of one or more bodies of water at or near the location, including:
        selecting one or more bodies of water at or near the location,
        determining a velocity and a depth of the selected bodies of water at one or more segments along the selected bodies of water,
        calculating one or more of runoff depth and flow rate of the selected bodies of water at the one or more segments based upon the velocity and the depth, and
        computing a friction force of a surface material at the one or more segments;
    classifying, by the server computing device, each segment of the bodies of water according to a level of potential risk of hydrologic forces sweeping a moveable object away based upon the corresponding flow rate and associated friction force;
    generating, by the server computing device, a visual representation of the bodies of water that includes a classification indicator for one or more of the plurality of segments for display on the mobile computing device; and transmitting, by the server computing device, the visual representation to the mobile computing device.

11. The method of claim 10, wherein the location comprises global positioning system (GPS) coordinates.

12. The method of claim 10, wherein the server computing device generates a channel geometry-based velocity and a channel geometry-based depth for each of the one or more segments along the selected bodies of water using the calculated runoff depth and flow rate.

13. The method of claim 12, wherein the server computing device uses a real-time distributed hydrologic model to generate the channel geometry-based velocity and the channel geometry-based depth.

14. The method of claim 10, wherein generating a visual representation of the bodies of water that includes a classification indicator for one or more of the plurality of segments for display on the mobile computing device comprises:

rendering a map of the bodies of water on a display screen of the mobile computing device; and assigning the classification indicator as a visual element to one or more of the plurality of segments of the bodies of water based upon the overall level of potential risk associated with the segment.

15. The method of claim 14, wherein the classification indicator comprises a color value corresponding to the overall level of potential risk associated with the segment.

16. The method of claim 10, wherein upon receiving the visual representation from the server computing device, the mobile computing device generates an alert to notify a user of the mobile computing device.

17. The method of claim 10, wherein the one or more bodies of water comprise moving bodies of water.

18. The method of claim 10, wherein the level of potential risk of hydrologic forces sweeping an object away based upon the corresponding flow rate and associated friction force for a segment of the bodies of water is used to estimate a hazard for undertaking a swiftwater rescue at the location of the segment.

* * * * *